United States Patent
Yamakawa et al.

(10) Patent No.: US 8,254,887 B2
(45) Date of Patent: Aug. 28, 2012

(54) COMMUNICATION TERMINAL DEVICE AND COMPUTER PROGRAM PRODUCT

(75) Inventors: Daisuke Yamakawa, Kawasaki (JP); Soichi Kuwahara, Yokohama (JP); Hidemi Kanda, Hiroshima (JP)

(73) Assignee: Fujitsu Limited, Kawasaki (JP)

( * ) Notice: Subject to any disclaimer, the term of this patent is extended or adjusted under 35 U.S.C. 154(b) by 1319 days.

(21) Appl. No.: 11/898,790

(22) Filed: Sep. 14, 2007

(65) Prior Publication Data

US 2008/0070553 A1  Mar. 20, 2008

Related U.S. Application Data

(63) Continuation of application No. PCT/JP2005/004618, filed on Mar. 16, 2005.

(51) Int. Cl.
*H04M 3/42* (2006.01)
*H04M 11/00* (2006.01)

(52) U.S. Cl. ............... 455/412.1; 455/413; 455/563

(58) Field of Classification Search ............ 709/201, 709/206, 228; 379/88.14, 88.17, 355.05; 455/550.1, 413, 415, 435.3, 412.1, 405, 420, 455/456.1; 370/110.1
See application file for complete search history.

(56) References Cited

U.S. PATENT DOCUMENTS

| | | | | |
|---|---|---|---|---|
| 5,930,700 A * | 7/1999 | Pepper et al. | | 455/435.3 |
| 6,947,528 B1 * | 9/2005 | Ko et al. | | 379/88.17 |
| 7,308,082 B2 * | 12/2007 | Davis et al. | | 379/88.14 |
| 7,516,163 B1 * | 4/2009 | Jordan, Jr. | | 1/1 |
| 2003/0149776 A1 * | 8/2003 | Tsunezumi | | 709/228 |
| 2006/0046768 A1 * | 3/2006 | Kirbas | | 455/550.1 |

FOREIGN PATENT DOCUMENTS

| | | |
|---|---|---|
| JP | 5-176042 | 7/1993 |
| JP | 11-196177 | 7/1999 |
| JP | 2000-138742 | 5/2000 |
| JP | 2000-174891 | 6/2000 |
| JP | 2003-115920 | 4/2003 |

OTHER PUBLICATIONS

International Search Report (PCT/ISA/210) of the International Application PCT/JP2005/004618 (mailed on May 10, 2005). (1pg).

* cited by examiner

*Primary Examiner* — Kiet Doan
(74) *Attorney, Agent, or Firm* — Staas & Halsey LLP

(57) ABSTRACT

A communication terminal device of the present invention having a storage unit with an address book where a name information for specifying a communication partner, an identification number, and characteristic information of voice, are associated with one another, so as to allow bi-directional communication using voice, and having a recording unit for recording a voice of the communication partner when outgoing call is transmitted or incoming call is received if the identification number of the communication partner at a outgoing destination or a outgoing source is not included in the address book, an analysis unit for extracting the characteristic information from the voice recorded by the recording unit, and a registration unit for updating the address book by associating the identification number of the communication partner with the characteristic information included in the address book if the characteristic information extracted by the analysis unit is included in the address book.

12 Claims, 16 Drawing Sheets

ADDRESS BOOK 131

| ID | NAME | IDENTIFICATION NUMBER | VOICE CHARACTERISTIC |
|---|---|---|---|
| A01 | Alice | 03-xxxx-xxxx | |
| B01 | Bill | 090-xxxx-xxxx | |
| A02 | Angela | 050-xxxx-xxxx | |
| ... | ... | ... | ... |

FIG.2
| ID | NAME | ADDRESS BOOK 131 ||
| | | IDENTIFICATION NUMBER | VOICE CHARACTERISTIC |
|---|---|---|---|
| A01 | Alice | 03-xxxx-xxxx |  |
| B01 | Bill | 090-xxxx-xxxx |  |
| A02 | Angela | 050-xxxx-xxxx |  |
| ... | ... | ... | ... |

FIG.4

OUTGOING AND INCOMING CALL HISTORY TABLE 132

| OUTGOING OR INCOMING | ID | TIME | NAME | IDENTIFICATION NUMBER | RECORDING DATA |
|---|---|---|---|---|---|
| OUTGOING | 01 | T1 | - | 080-xxxx-xxxx | xxx.mp3 |
| OUTGOIING | 02 | T2 | - | 06-xxxx-xxxx | xxx.mp3 |
| INCOMING | 01 | T3 | Angela | 050-xxxx-xxxx | - |
| ... | ... | ... | ... | ... | ... |

FIG.10A

| ID | NAME | IDENTIFICATION NUMBER | VOICE CHARACTERISTIC |
|---|---|---|---|
| A01 | Alice | 03-xxxx-xxxx | |
| B01 | Bill | 090-xxxx-xxxx | |
| A02 | Angela | 050-xxxx-xxxx | |
| ... | ... | ... | ... |

ADDRESS 131

FIG.10B

VOICE CHARACTERISTIC / IDENTIFICATION NUMBER: 06-xxxx-xxxx

MATCH ↓

| ID | NAME | IDENTIFICATION NUMBER | VOICE CHARACTERISTIC |
|---|---|---|---|
| ... | ... | ... | ... |
| B01 | Bill | 090-xxxx-xxxx, 06-xxxx-xxxx | |
| ... | ... | ... | ... |

ADD

FIG.10C

| ID | NAME | IDENTIFICATION NUMBER | VOICE CHARACTERISTIC |
|---|---|---|---|
| ... | ... | ... | ... |
| B01 | Bill | 06-xxxx-xxxx | |
| ... | ... | ... | ... |

OVERWRITE

FIG.10D

| ID | NAME | IDENTIFICATION NUMBER | VOICE CHARACTERISTIC |
|---|---|---|---|
| ... | ... | ... | ... |
| B01 | Bill | 090-xxxx-xxxx | |
| ... | ... | ... | ... |
| B02 | Bill(2) | 06-xxxx-xxxx | |
| ... | ... | ... | ... |

NEW

COMMUNICATION TERMINAL DEVICE AND COMPUTER PROGRAM PRODUCT

CROSS REFERENCE TO RELATED APPLICATIONS

This application is a continuation of International Application No. PCT/JP2005/004618, filed on Mar. 16, 2005, now pending, herein incorporated by reference.

BACKGROUND OF THE INVENTION

1. Field of the Invention

The present invention relates to a communication terminal device such as a portable telephone, and to a related computer program product.

2. Description of the Related Art

Portable telephones are now widely used. Normally a portable telephone has a telephone book function (or address book function) for managing personal telephone numbers, and a outgoing and incoming call history function for storing the telephone numbers of the callers and receivers.

If the address book function is used, the user can efficiently manage the telephone numbers of a plurality of individuals by manually inputting the telephone number corresponding to an individual and the name of the owner of the telephone number, and registering them as one data entry. When the user calls an individual for whom the telephone number is registered in the address book, all that is required is to select the individual from the candidates registered in the address book, and the troublesome task of inputting the telephone number is omitted.

In many cases, when the outgoing and incoming call history function is used, the screen displaying the outgoing and incoming call history can be switched directly to the address book registration screen, so that the telephone numbers remaining in the outgoing and incoming call history can be easily registered in the address book.

Recently, however, one individual often corresponds to a plurality of telephone numbers, that is one individual often has a plurality of telephone numbers, for example, the telephone number of the work site which is printed on a business card, the number of a portable telephone provided by the company for work, a number of a portable telephone which is used privately, a number of a stationary phone at home, and a telephone number of a facsimile.

In a situation where one individual has a plurality of telephone numbers, if the telephone number that remains in the outgoing and incoming call history is registered in the address book, the owner of this telephone number could be a same owner of another telephone number already registered in the address book.

A prior art related to the registration of the telephone number to the address book, Japanese Patent Application Laid-Open No. 2000-174891 proposes a technology for locking the telephone number that remains in the outgoing and incoming call history by the operation of the user, so that deletion of the locked telephone number from the outgoing and incoming call history is prevented before it is registered in the address book. When the telephone number is locked, the user can record the name of the owner of the telephone number by voice. And when the telephone number is registered in the address book, the user can call up the owner of the telephone number that remains in the outgoing and incoming call history by reproducing the recorded voice.

As a background technology on telephones, Japanese Patent Application Laid-Open No. 2000-138742, No. H11-196177 and No. 2003-115920 are known. For example, Japanese Patent Application Laid-Open No. 2000-138742 proposes that a callers voice is automatically recorded when a call is received, and the recorded voice is saved in the address book along with the telephone number, and is used as a ring back tone.

However, in the prior art, when the telephone number that remains in the outgoing and incoming call history is registered in the address book, a user's operation is required even when the owner of the telephone number is the same as an owner of another telephone number already registered in the address book. In other words, the user must call up the data entry of the same person registered in the address book. Then the user must select such the operation as replacing the already registered telephone number and the telephone number that remains in the outgoing and incoming call history (overwrite processing), or adding the telephone number that remains in the outgoing and incoming call history (addition processing).

SUMMARY OF THE INVENTION

With the foregoing in view, it is an object of the present invention to provide a communication terminal device which makes the operation of registering another telephone number of an individual, who has already been registered in the address book, to the address book easier, and related programs.

To achieve the above object, a first aspect of the present invention provides a communication terminal device having a storage unit with an address book which includes a plurality of entries where a name information for specifying a communication partner, an identification number of the communication partner, and characteristic information of voice of the communication partner are associated with one another, a display unit for displaying the information registered in the address book based on a display request, and an input unit for inputting a select signal for specifying the communication partner using the information registered in the address book and displayed on the display unit, so as to allow bi-directional communication using voices, with the communication terminal device with the identification number corresponding to the communication partner specified via the input unit, the communication terminal device having: a recording unit for stopping the recording voice of the communication partner at a outgoing destination or a outgoing source if the identification number of the communication partner at the outgoing destination or the outgoing source is included in the address book, and recording the voice of the communication partner at the outgoing destination or the outgoing source if not included, an analysis unit for extracting the characteristic information from the voice recorded by the recording unit, and a registration unit for updating an entry in the address book by associating the identification number of the communication partner at the outgoing destination or the outgoing source, with the characteristic information included in the address book if the characteristic information extracted by the analysis unit is included in the address book.

In this aspect of the present invention, if the characteristic information extracted by the analysis unit is not included in the address book, the registration unit adds a new entry in the address book by associating the identification number of the communication partner at the outgoing destination or the outgoing source, with the characteristic information extracted by the analysis unit. In this aspect of the invention, it is also preferable that if the characteristic information extracted by the analysis unit is included in the address book, the registration unit displays, on the display unit, a screen to select a first processing for updating the entry in the address book by associating the identification number of the communication partner at the outgoing destination or the outgoing source, with the characteristic information included in the address book, or a second processing for overwriting the entry in the address book by replacing the identification number associated with the characteristic information included in the address book, with the identification number of the communication partner at the outgoing destination or the outgoing source.

In this aspect of the invention, it is also preferable that if the characteristic information extracted by the analysis unit is not included in the address book, the registration unit displays, on the display unit, a screen to select a third processing for adding a new entry in the address book by associating the identification number of the communication partner at the outgoing destination or the outgoing source, with the characteristic information extracted by the analysis unit. In this aspect of the invention, it is also preferable that the storage unit further has an outgoing and incoming call history table that includes the identification number of the communication partner at the outgoing destination to which outgoing call is transmitted or the outgoing source from which incoming call is received, and characteristic information of the voice of the communication partner, the recording unit records the voice of the communication partner when outgoing call is transmitted or incoming call is received if the identification number of the communication partner at the outgoing destination or the outgoing source is not included in either the address book or the transmission/reception history table, and the analysis section stores the extracted characteristic information in the outgoing and incoming call history table in association with the identification number of the communication partner at the outgoing destination or the outgoing source.

To achieve the above object, a second aspect of the present invention provides a program for a communication terminal device which has: a storage unit with an address book which includes a plurality of entries where a name information for specifying a communication partner, an identification number of the communication partner and characteristic information of voice of the communication partner, are associated with one another; a display unit for displaying the information registered in the address book based on a display request; and an input unit for inputting a select signal for specifying the communication partner using the information registered in the address book and displayed on the display unit, so as to allow bi-directional communication using voices, with the communication terminal device with the identification number corresponding to the communication partner specified via the input unit, the program causing the communication terminal device to execute the steps of: stopping the recording voice of the communication partner at the outgoing destination or the outgoing source if the identification number of the communication partner at the outgoing destination or the outgoing source is included in the address book, and recording the voice of the communication partner at the outgoing destination or the outgoing source if not included; extracting the characteristic information from the recorded voice; and updating an entry in the address book by associating the identification number of the communication partner at the outgoing destination or the outgoing source, with the characteristic information included in the address book, if the extracted characteristic information is included in the address book.

To achieve the above object, a third aspect of the present invention provides an outgoing and incoming call processing method executed in a communication terminal device which has: a storage unit with an address book which includes a plurality of entries where a name information for specifying a communication partner, an identification number of the communication partner and characteristic information of voice of the communication partner, are associated with one another; a display unit for displaying the information registered in the address book based on a display request; and an input unit for inputting a select signal for specifying the communication partner using information registered in the address book and displayed on the display screen, so as to allow bi-directional communication using voices, with the communication terminal device with the identification number corresponding to the communication partner specified via the input unit, the method having steps of: recording the voice of the communication partner at the outgoing destination or the outgoing source if the identification number of the communication partner at the outgoing destination or the outgoing source is not included in the address book, by the communication terminal device; extracting the characteristic information from the recorded voice, by the communication terminal device; and updating the entry in the address book by associating the identification number of the communication partner at the outgoing destination or the outgoing source, with the characteristic information included in the address book, if the extracted characteristic information is included in the address book.

According to the communication terminal device of the present embodiment, a user is specified based on the characteristic information of voice of the caller. Therefore even if a user already registered in the address book calls the communication terminal device of the present embodiment with a new number that is different from the one registered in the address book, the communication terminal device can identify the communication partner calling as one already registered in the address book. Then the communication terminal device automatically calls up the entry registered in the address book, so operation to register this new number in the address book becomes easier. The communication terminal device 1 can also automatically register the new number in the address book, which further decreases the operation load on the user.

BRIEF DESCRIPTION OF THE DRAWINGS

FIG. 2 shows a data configuration example of an address book;

FIG. 4 shows a data configuration example of a transmission/reception history table;

FIG. 10A shows a data configuration example of the address book before automatic registration processing, FIG. 10B shows a data configuration example of the address book after addition registration, FIG. 10C shows a data configuration example of the address book after overwrite registration, and FIG. 10D shows a data configuration example of the address book after new registration;

DESCRIPTION OF THE PREFERRED EMBODIMENTS

Embodiments of the present invention will now be described with reference to the drawings. The technical scope of the present invention, however, is not limited to these embodiments, but covers the invention stated in the Claims and equivalents thereof.

Figure 1:
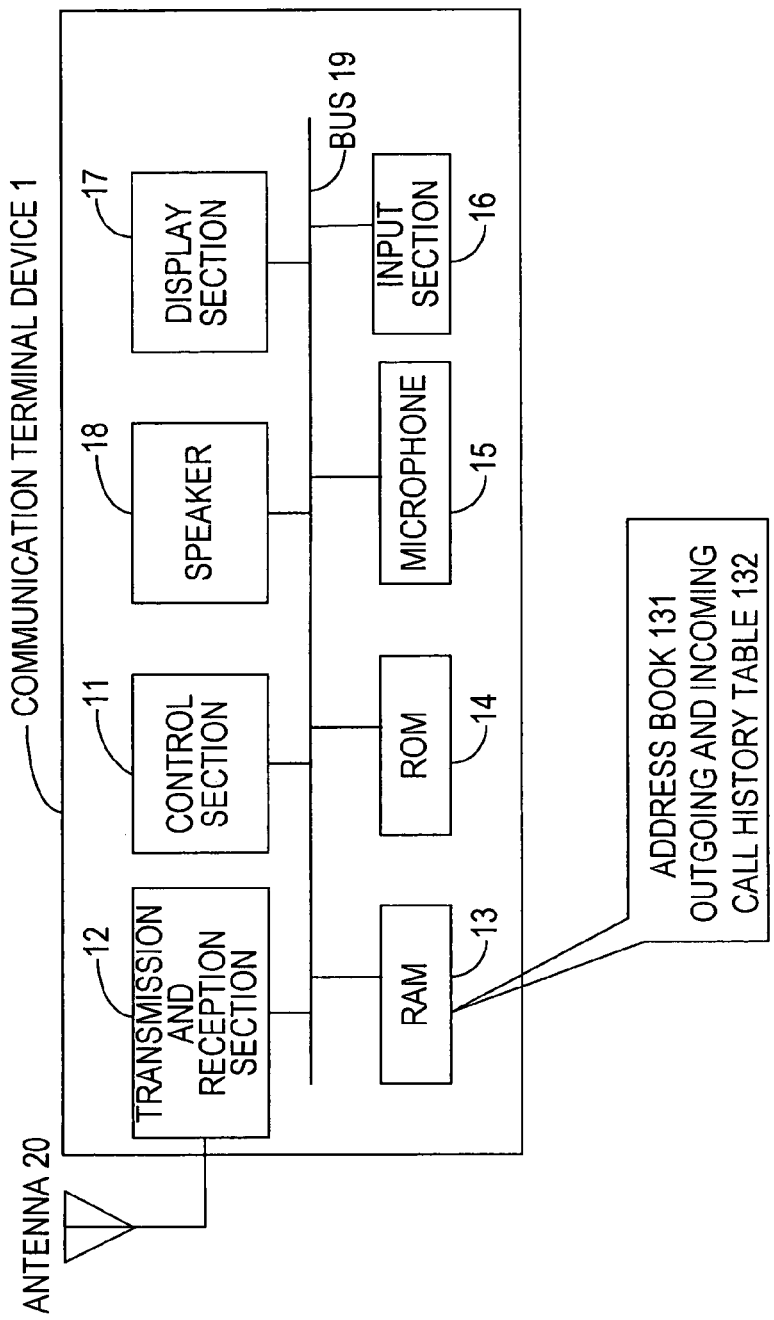
FIG. 1 is a block diagram depicting a configuration of the communication terminal device of an embodiment of the present invention.

FIG. 1 is a block diagram depicting the configuration of a communication terminal device 1 according to an embodiment of the present invention. The communication terminal device 1 shown in FIG. 1 is a portable telephone or cordless telephone used in the home (slave unit), for example. The communication terminal device 1 has an antenna 20, a transmission and reception section 12, a control section 11, RAM (Random Access Memory) 13, ROM (Read Only Memory) 14, a microphone 15, an input section 16, a display section 17, and a speaker 18, which are interconnected via a bus 19.

The antenna 20 outputs a control signal and audio signal in a predetermined frequency band received from a base station or a cordless telephone (master unit) to the later mentioned transmission and reception section 12. The antenna 20 also transmits a control signal and audio signal in a predetermined frequency band, which are input from the transmission and reception section 12, to the base station or the cordless telephone (master unit).

The transmission and reception section 12 converts the frequency of the control signal and audio signal into the signal with the predetermined frequency to be sent from the antenna 20. In the same way, the transmission and reception section 12 converts the frequency of the control signal and audio signal received from the antenna 20 into the signal with the predetermined frequency.

The ROM 14 is a storage unit for storing a control program, which is used for controlling the communication terminal device 1. This control program is developed in RAM 13 while the communication terminal device 1 is operating, and is executed by a CPU included in the control section 11.

The RAM 13 is a storage unit for temporarily storing the computing results and programs for processing of the communication terminal device 1. The RAM 13 includes an address book 131, where information of the communication partners who frequently use this communication terminal device 1 is registered, and a outgoing and incoming call history table 132, where the telephone numbers of a communication partner at a outgoing destination to which outgoing call is occurred and a communication partner at a incoming source from which incoming call is occurred, are recorded along with the time when the outgoing and incoming call occurred.

The microphone 15 is an input unit for inputting the voice of a user, and the speaker 18 is an output unit for outputting the voice of a communication partner. The input section 16 is an input unit for inputting a user's request, such as a button, cross keys, and a touch panel of a liquid crystal display. The display section 17 is a display unit to provide information to the user, such as a liquid crystal display.

The control section 11 includes a CPU (Central Processing Unit), which is not illustrated, and executes a control program developed in the RAM 13, so as to control the communication terminal device 1 and provide various functions. The control section 11 provides the functions of the conversion section, which performs conversion between analog signals and digital signals.

The conversion section converts analog signals, including the voice of the user which is input from the microphone 5, into digital signals to be transmitted via the antenna 20, and converts digital signals, including the voice of the communication partner which is input from the antenna 20, into analog signals to be output through the speaker 18, using PCM (Pulse Code Modulation), for example. The control section 11 extracts only the voice of the communication partner which is output through the speaker 18, and stores (records) it in the RAM 13 as audio data, such as an MP3 (MPEG 1 Audio Layer-3) file, wave file or Ogg Vorbis format file.

A feature of the communication terminal device 1 of the present embodiment is that the control section 11 provides the functions of a recording unit for recording the voice of the communication partner at the outgoing destination or outgoing source if the telephone number of the communication partner at the outgoing destination or outgoing source is not included in the address book 131, an analysis unit for extracting characteristic information for specifying a communication partner based on the voice recorded by the recording unit, and a registration unit for updating an entry in the address book 131 by associating the telephone number of the communication partner at the outgoing destination or outgoing source, with the characteristic information included in the address book 131, if the characteristic information extracted by the analysis unit is included in the address book 131. In this way, according to the communication terminal device 1 of the present embodiment, the user is specified based on the characteristic information of voice of the user.

Then, even if a user already registered in the address book 131 calls the communication terminal device 1 of the present embodiment from a new number which is different from the number registered in the address book 131, the communication terminal device 1 recognizes that the communication partner calling is a user already registered in the address book 131. The communication terminal device 1 automatically calls up the entry registered in the address book 131, so the operation to register the new number in the address book 131 is easy.

Also the communication terminal device 1 can also automatically register the new number in the address book 131, so operation load on the user can be further decreased. This mode will be described below in the sequence of data to be used and operation of the communication terminal device 1.

FIG. 2 shows a data configuration example of the address book 131. The address book includes data items "ID", "Name", "Identification Number" and "Voice Characteristic". "ID" is a number to identify the entry (row data) to be registered in the address book.

"Name" indicates a name of the communication partner which is input by the user. "Identification Number" is an identifier to specify the communication partner, and is a telephone number of the communication partner in the case of the present embodiment.

"Voice Characteristic" is biological characteristic information to specify the user extracted from the voice of the user. In FIG. 2, a model graphic is shown in the column of "Voice Characteristic", so as to illustrate the difference of voice characteristics depending on the individual, but in reality the data to specify voice characteristics is stored.

In the communication terminal device 1 of the present embodiment, characteristic information of the speaker (communication partner) is extracted from the recorded voice. For the method of extracting characteristic information from the recorded voice, various prior arts can be used. According to Japanese Patent Application Laid-Open No. 2004-53821, for example, the voice characteristic parameter is extracted from the recorded voice, and this voice characteristic parameter can be used as a "voice characteristic" in the present embodiment.

Figure 3B:
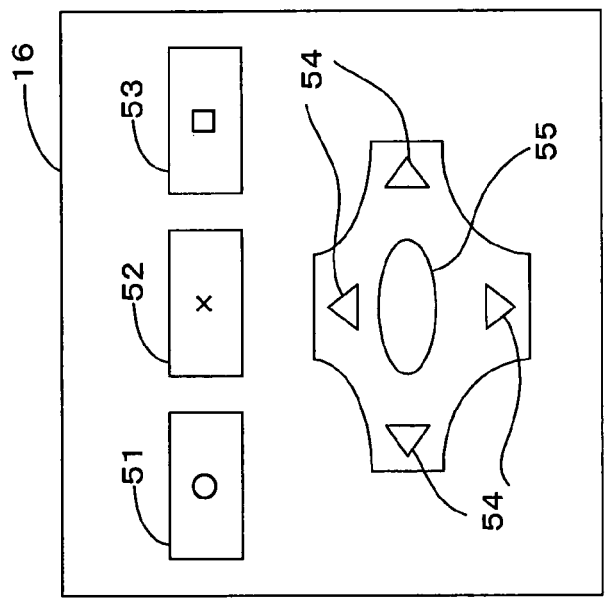
FIG. 3B shows an example of the arrangement of buttons of an input section which is used for the display operation of the information to be stored in the address book.
Figure 3A:
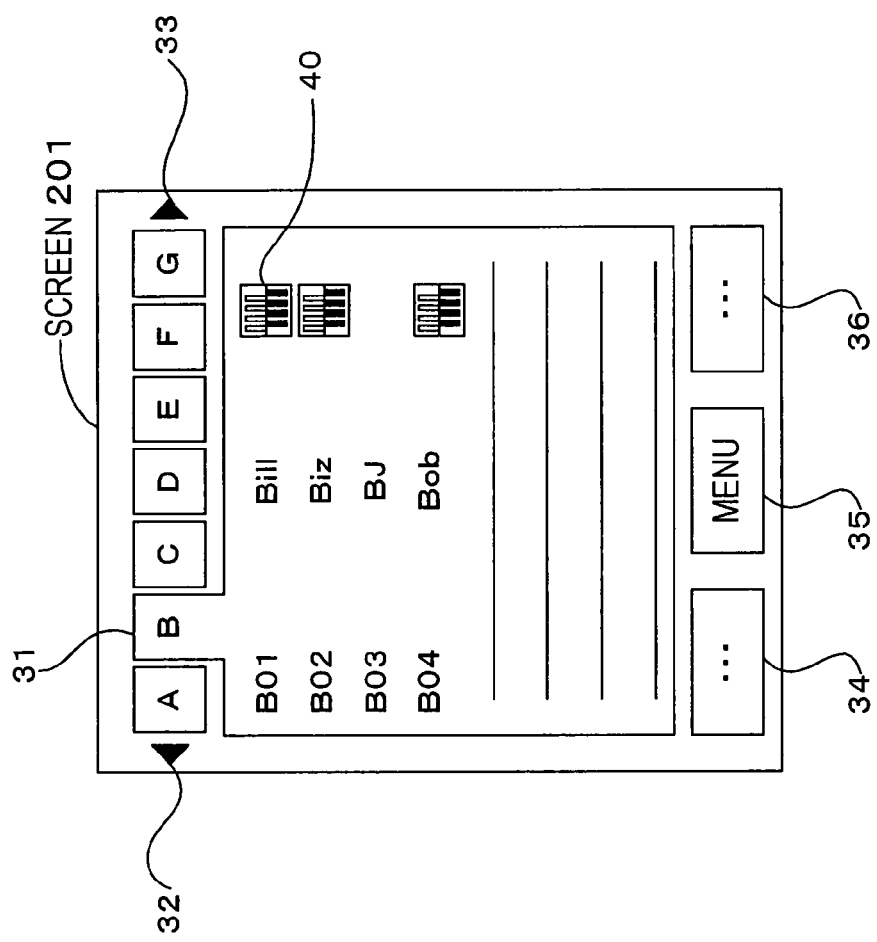
FIG. 3A shows a screen example when the information to be stored in the address book is displayed on the display section.

FIG. 3A shows a screen example when the information stored in the address book 131 is displayed on the display section 17. If a communication partner to call has already been registered in the address book 131, the user can make a phone call merely by calling up the information registered in the address book 131, and make a selection.

A name tab 31 is an alphabetic symbol that indicates an initial character of the name, on the screen 201. By selecting the name tab 31, the information to be displayed on the display section 17 is switched, so the user can search the name of the communication partner to whom a phone call is made. The name tab "B" is selected and registered users whose names start with "B" are displayed on the screen 201.

In addition to the registered users whose names start with "B", the ID of each registered user ("ID" in FIG. 2) and the voice characteristic extracted symbol 40 are shown on the screen 201. The third user "BJ" shown on the screen 201 has no voice characteristic extracted symbol 40, and this status could be because no call was outgoing or incoming at all to or from user "BJ" after the user registered the entry "BJ" in the address book 131 by manual input. In this case, the voice of the user "BJ" has not been recorded, and the display status becomes as shown on the screen 201.

If all name tabs 31 cannot be displayed on the display section 17, a left scroll symbol 32 and a right scroll symbol 33 are displayed, as shown on the screen 201, so that the user can navigate and view all displayed information via the input section 16. At the bottom of the screen 201, a menu button 35 is displayed, and if this menu button 35 is selected via the input section 16, the display screen of the address book 131 ends, and the display can return to the initially displayed screen by calling up the operation menu of the communication terminal device 1.

FIG. 3B shows an example of the arrangement of the buttons of the input section 16 to be used for display operation of the information to be stored in the address book 131. ○ button 51, x button 52, and □ button 53 are disposed corresponding to the function buttons (e.g. menu button 35) displayed at the bottom of the screen 201. For example, if the user presses the x button in a status where the screen 201 is displayed on the display section 17, the menu button 35 is selected.

Cross keys 54 are direction selection buttons, where four buttons are disposed in the left, right, top, bottom directions. The name tab 31 can be switched on the screen 201 by the buttons in the left and right directions of the cross keys 54, and a user registered in the switched name tab 31 can be selected by the buttons in the up and down directions of the cross keys 54. The center of the cross keys is a decision button 55, whereby displaying the information on the selected user on the display section 17 can be decided.

FIG. 4 shows a data configuration example of the outgoing and incoming call history table 132. The outgoing and incoming call history table 132 includes the data items "Outgoing or Incoming", "ID", "Time", "Name", "Identification Number" and "Recording Data". "Outgoing or Incoming" is flag information to indicate whether outgoing or incoming call is occurred.

"ID" is a serial number that indicates the sequence, and the greater the number the older the outgoing or incoming call. "Time" indicates the time when the outgoing or incoming call is occurred. "Name" is a name of the communication partner at the outgoing destination to which outgoing call is occurred or at outgoing incoming source from which incoming call is occurred, and is the same as "Name" registered in the address book 131 (see FIG. 2).

"Identification Number" is a telephone number of the outgoing destination or the outgoing source to be notified to the communication terminal device 1 when outgoing or incoming call is occurred. "Recording Data" shows a file path where the recorded voice data of the communication partner is stored. FIG. 4 shows the status where the voice data is stored as an MP3 file.

The first and second entries shown in FIG. 4 show that a call is outgoing to a number which is not registered in the address book 131, and the voice of the communication partner (outgoing destination in this case) is recorded during the call. The third entry shown in FIG. 4 shows that a call is incoming from an individual having a number registered in the address book 131, or an individual having a voice characteristic information the same as an individual registered in the address book 131.

Figures 5A, 5B:
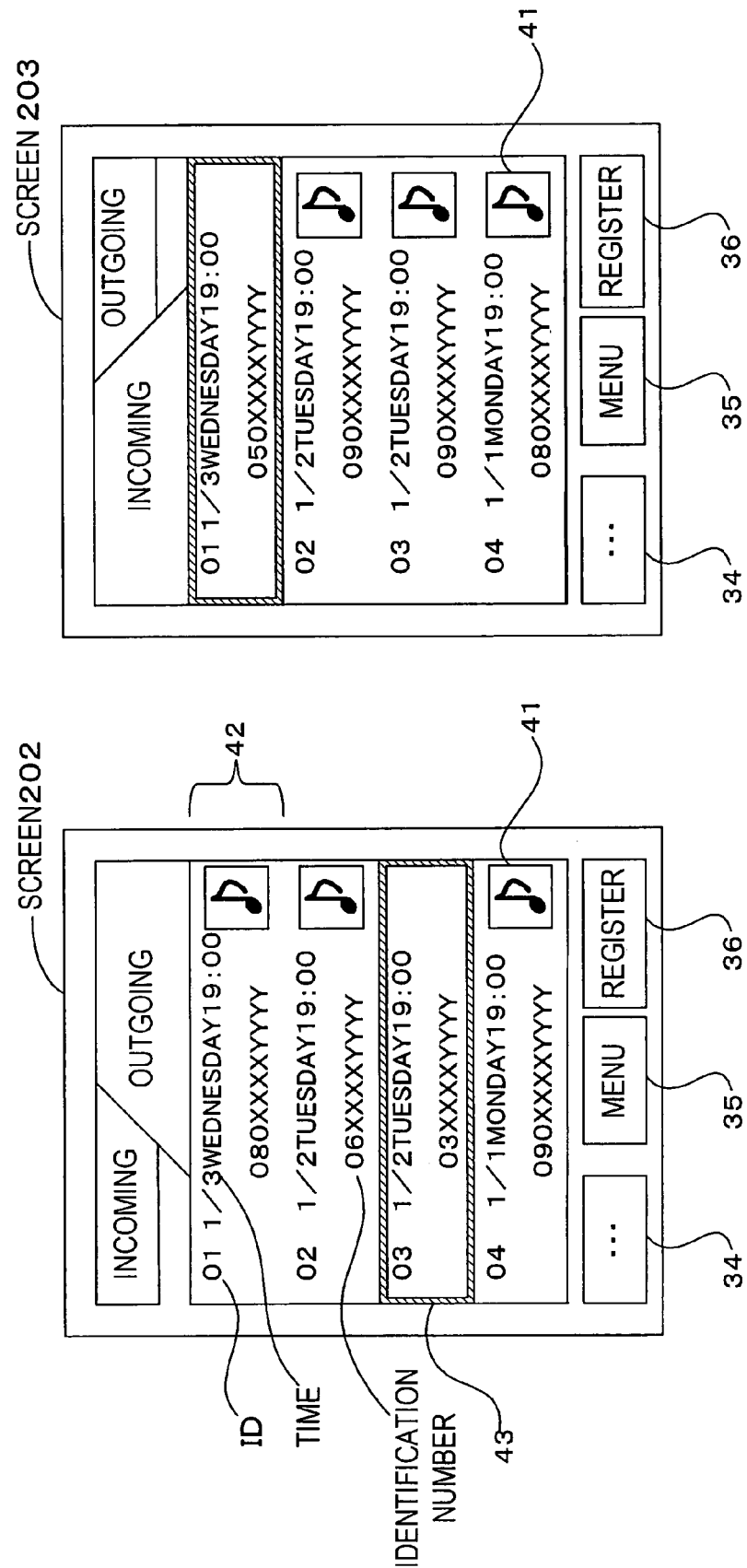
FIG. 5A shows a screen example when the transmission history is displayed on the display section.
FIG. 5B shows a screen example when the reception history is displayed on the display section.

FIG. 5A shows a screen example when the outgoing history is displayed on the display section 17. Four entries of information included in the outgoing history are displayed on the screen 202. In each entry 42 displayed on the screen 202, "ID", "Time" and "Identification Number" are displayed. A symbol 41 indicates that the voice of the communication partner is recorded during the call and is also displayed in FIG. 5A. The selection target is switched by moving the cursor 43 displayed on the screen 202 by operating the buttons arranged in the input section 16 (see FIG. 3B, buttons in the up and down directions of the cross keys 54, for example).

At the bottom of the screen 202, a menu button 35 and a registration button 36 are displayed as function buttons. The menu button 35 is as described in FIG. 3. If the registration button 36 is selected via the input section 16 in a status where the cursor is positioned on an entry, that is in a status where the entry is selected by the user, the selected entry is registered in the address book 131.

At this time, the display is switched to the screen for registering the telephone number included in an entry selected from the incoming history on the screen 202 in the address book 131. The menu button 35 and the registration button 36 are selected on the screen 202 by the user pressing the x button 52 and □ button 53 respectively in the input section 16 shown in FIG. 3B, for example.

FIG. 5B shows a screen example when the incoming history is displayed on the display section 17. Four entries of information included in the incoming history are displayed on the screen 203. The content displayed as incoming history is the same as the content display on the screen 202 (FIG. 5A) as outgoing history, so description is omitted here. The screen 202 and the screen 203 are switched on the display by the user pressing the buttons in the left and right directions of the cross keys 54 in the input section 16 shown in FIG. 3B, for example.

Figure 6:
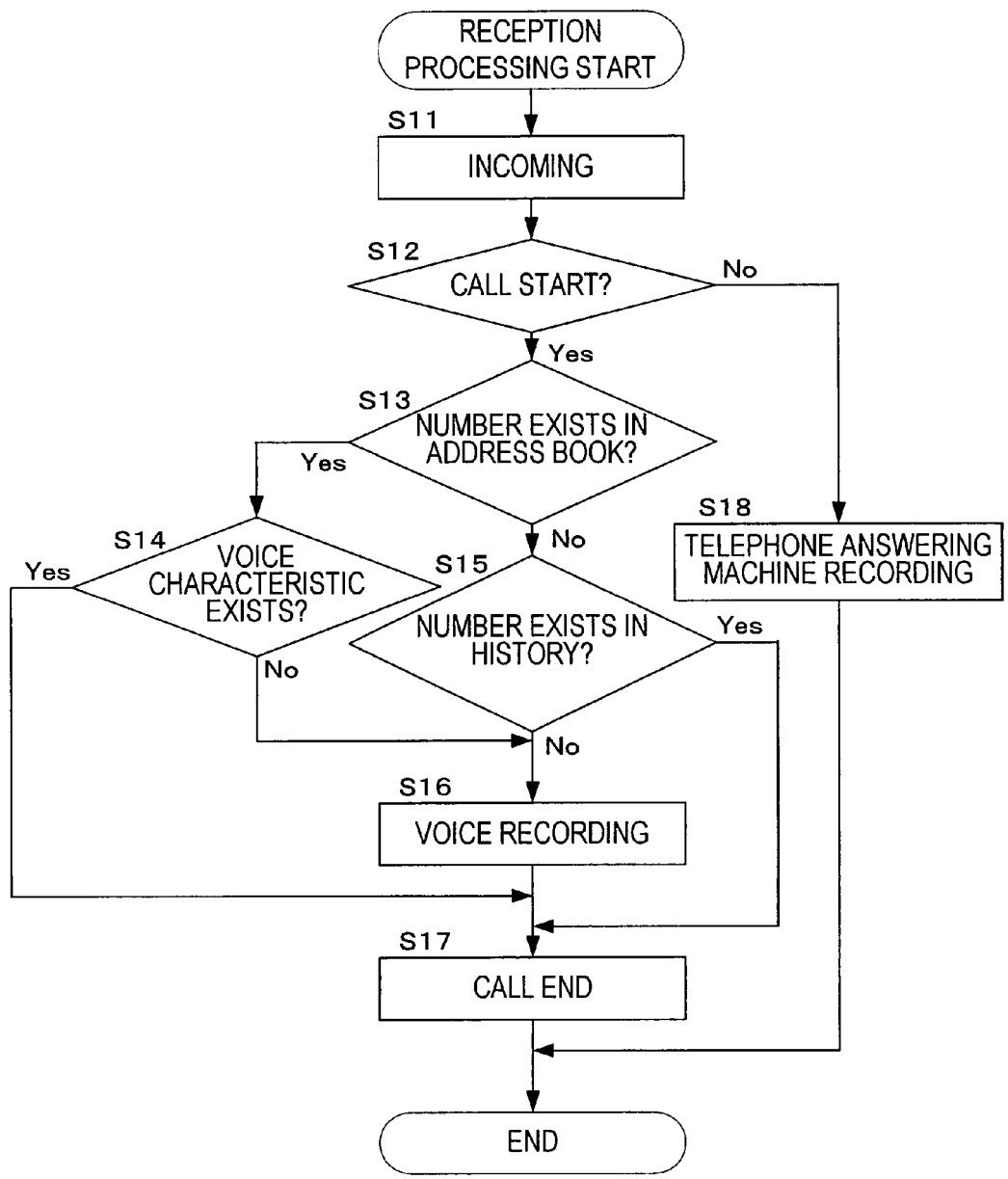
FIG. 6 is a flow chart depicting the reception processing in the communication terminal device of the present embodiment.

FIG. 6 is a flow chart depicting the reception processing in the communication terminal device 1 of the present embodiment. First an incoming call is occurred in the communication terminal device 1 (S11). Then the communication terminal device 1 judges whether the call start request is input within a predetermined time (S12).

If one of the buttons disposed in the input section 16 is pressed, for example, the communication terminal device 1 can judge that the call start request is input. In the case when one of the button disposed in the input section 16 is assigned to the "call start button", the communication terminal device 1 can judge that the call start request is input if this "call start button" is pressed.

If the call start request is not input within a predetermined time from the call reception (S12, NO), the communication terminal device 1 executes a telephone answering machine function, and notifies that the owner of the communication terminal device 1 cannot answer the call, then records the message from the communication partner (S18) and ends the call reception processing. After step S18, the communication terminal device 1 performs the post reception processing described in FIG. 7.

If the call start request is input within a predetermined time from the call reception (S12, YES), the communication terminal device 1 judges whether the telephone number of the communication partner, that is notified at call reception, is registered in the address book 131 (S13). The communication terminal device 1 searches for the "Identification Number" in the address book 131 using the notified telephone number as a key, and checks if a matching entry exists.

If the matching entry exists in the address book 131 as a result of search (S13, YES), the communication terminal device 1 judges whether the voice characteristic has been extracted in this matched entry (S14). The communication terminal device 1 judges that the voice characteristic has been detected if data is stored in the "Voice Characteristic" of the matching entry in the address book 131 (see FIG. 2).

If the voice characteristic has been extracted in the matching entry as a result of the search in step S13 (S14, YES), the communication terminal device 1 waits for the input of the call end request, and ends the call without recording the voice of the communication partner on the call received this time (S17), and ends the call reception processing. After step S17, the communication terminal device 1 performs the post reception processing described in FIG. 7.

The input of the call end request in step S17 is judged in the same way as judgment of the input of the call start request. For example, if one of the buttons disposed in the input section 16 is assigned to the "call end button", the communication terminal device 1 judges that the call end request is input if this "call end button" is pressed.

If the voice characteristic has not been extracted in the matching entry as a result of the search in step S13 (S14, NO), the communication terminal device 1 records the voice of the communication partner on the call received this time (S16). The processing in step S16 is performed if the call is first received after the user registered the communication partner manually in the address book 131, as described for the third user "BJ" shown on the screen 201 in FIG. 3.

In step S16, the communication terminal device 1 records the voice which is output from the speaker 18 ten seconds after the start of the call, and stores it in the RAM 13, for example. When step S16 ends, the communication terminal device 1 waits for the input of the call end request, ends the call (S17), and ends the call reception processing. After step S17, the communication terminal device 1 performs the post reception processing described in FIG. 7.

If the matching entry does not exist in the address book 131 as a result of searching in step S13 (S13, NO), the communication terminal device 1 judges whether the telephone number of the communication partner, which is notified when the call is received, is registered in the outgoing and incoming call history table 132 (S15). The communication terminal device 1 searches for the "Identification Number" of the outgoing and incoming call history table 132 using the notified telephone number as a key, and checks whether the matching entry exists.

If the matching entry exists in the outgoing and incoming call history table 132 as a result of searching (S15, YES), the communication terminal device 1 waits for input of the call end request without recording the voice of the communication partner in the call received this time, and ends the call (S17). If the matching entry does not exist in the outgoing and incoming call history table 132 as a result of searching in step S15 (S15, NO), the communication terminal device 1 records the voice of the communication partner in the call received this time (S16).

When step S16 ends, the communication terminal device 1 waits for input of the call end request, ends the call (S17), and ends the call reception processing. After step S17, the communication terminal device 1 performs the post reception processing described in FIG. 7.

Figure 7:
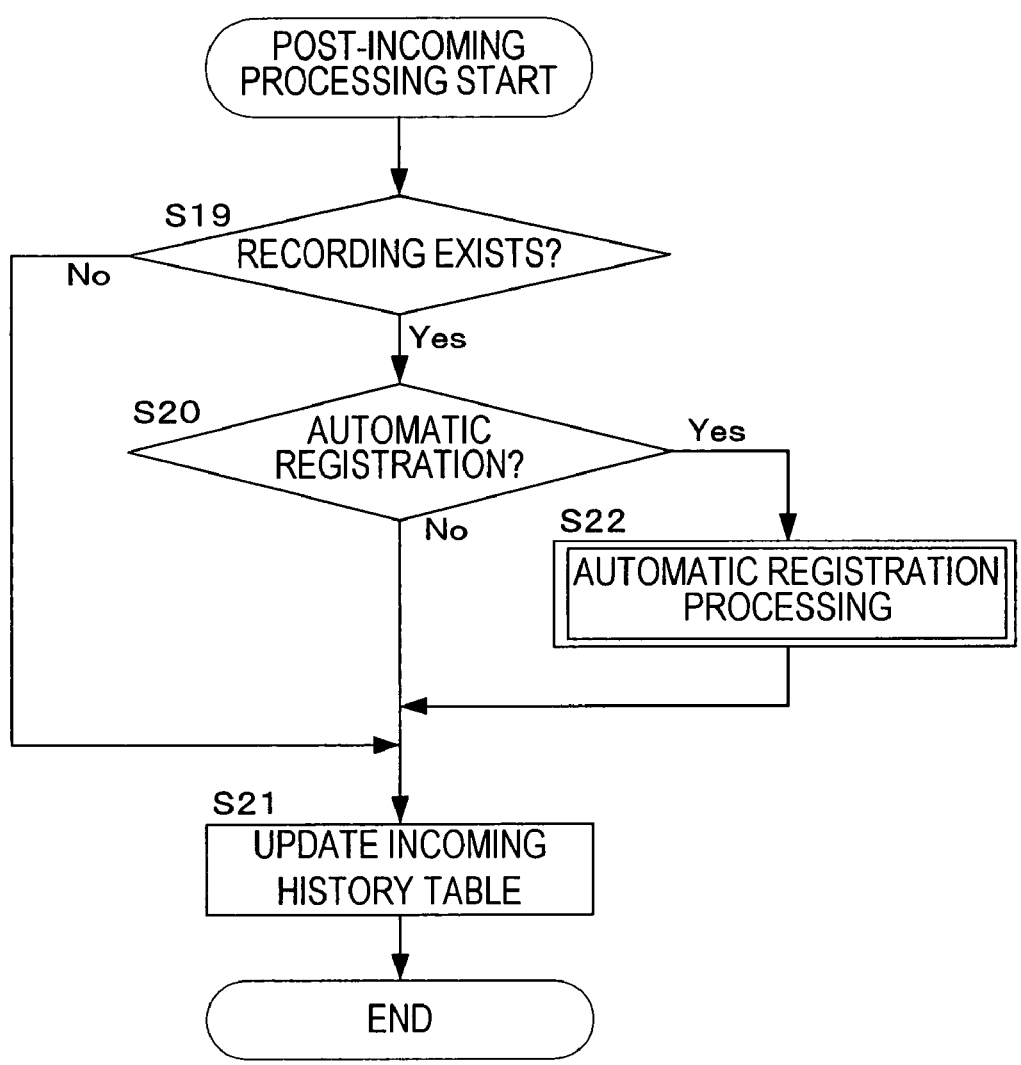
FIG. 7 is a flow chart depicting the post reception processing in the communication terminal device of the present embodiment.

FIG. 7 is a flow chart depicting the post incoming processing in the communication terminal device 1 of the present embodiment. The communication terminal device 1 executes the processing shown in this flow chart after the processing in step S17 or step S18 in FIG. 6.

First the communication terminal device 1 judges whether recording was performed for the incoming call received this time (S19). For example, if voice data recorded in step S16 exists in the RAM 13, the communication terminal device 1 judges that recording was performed. The communication terminal device 1 also judges that recording was performed if a message remains on the telephone answering machine in step S18.

If it is judged that recording was performed in the processing in step S19 (S19, YES), the communication terminal device 1 judges whether automatic registration will be performed (S20). If the automatic registration flag (not illustrated), which is stored in the RAM 13 in advance, is "ON", for example, the communication terminal device 1 can judge that automatic registration will be performed.

If it is judged that automatic registration will be performed (S20 YES), the communication terminal device 1 performs the automatic registration processing (S22). The automatic registration processing will be described in FIG. 8. If the automatic registration processing completes, the communication terminal device 1 updates "Outgoing or Incoming", "ID", "Time", "Name", "Identification Number" and "Recording Data" of the outgoing and incoming history table 132. Particularly, if the characteristic information extracted based on the recording data matches the characteristic information already registered in the address book 131, the communication terminal device 1 reflects the "Name" already registered in the address book 131 in the outgoing and incoming history table 132.

If it is judged that recording was not performed in the processing in step S19 (S19, NO), or if it is judged that automatic registration will not be performed in the processing in step S20 (S20, NO), the communication terminal device 1 updates the outgoing and incoming history table 132 without performing automatic registration processing (S21). Unlike the update performed after automatic registration processing (S22), the information registered in the address book 131 is not reflected in "Name".

Figure 8:
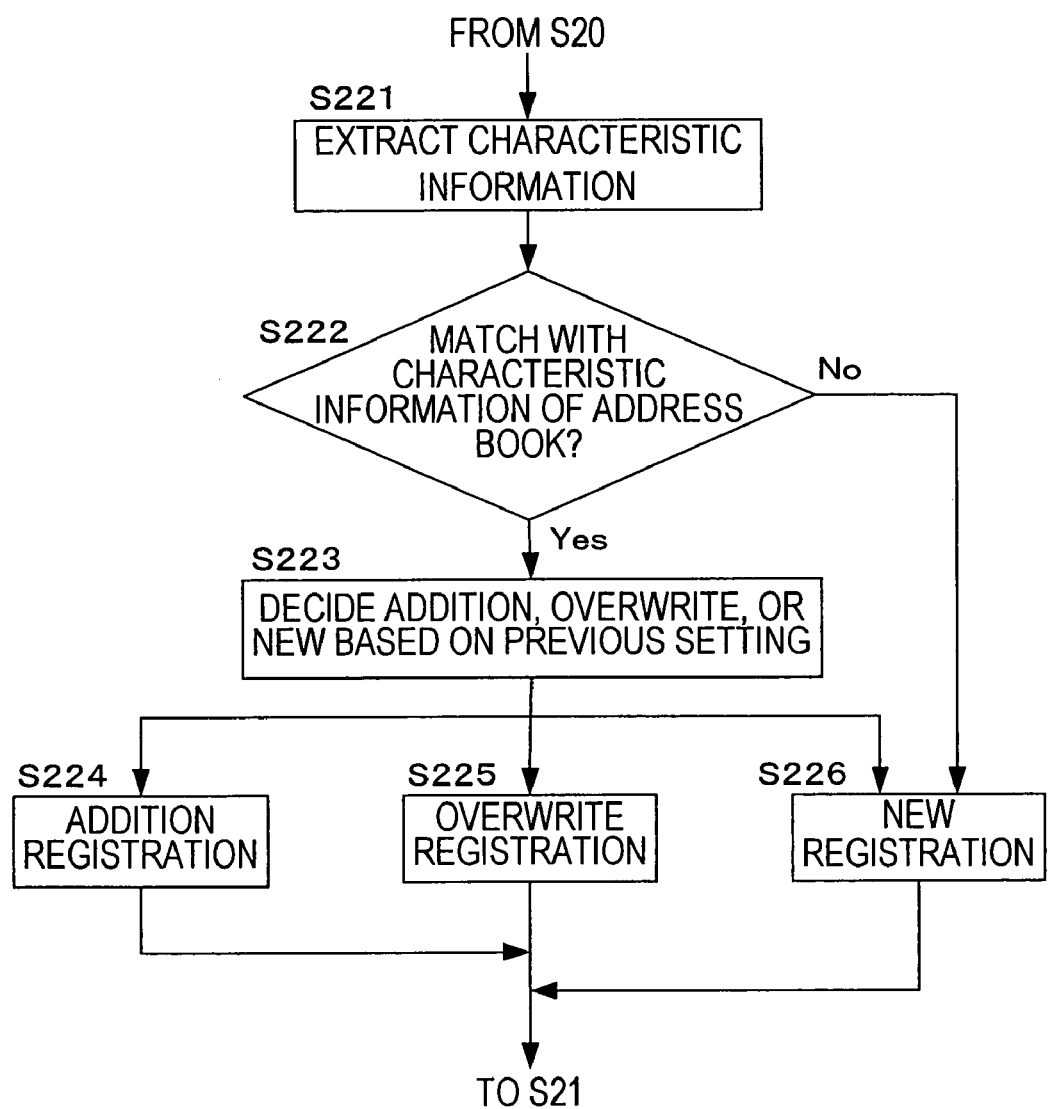
FIG. 8 is a flow chart depicting the automatic registration processing in the communication terminal device of the present embodiment.

FIG. 8 is a flow chart depicting the automatic registration processing in the communication terminal device 1 of the present embodiment. First the communication terminal device 1 extracts the characteristic information based on the recorded voice data (S221). For the method for extracting characteristic information from the recorded voice data, various prior arts can be used as described in FIG. 2 (e.g. Japanese Patent Application Laid-Open No. 2004-53821).

Then the communication terminal device 1 judges whether the characteristic information extracted in step S221 matches the characteristic information stored in the address book 131 (S222). For example, if the character information is represented by the voice characteristic parameter shown in Japanese Patent Application Laid-Open No. 2004-53821, the communication terminal device 1 searches the "Characteristic Information" of the address book 131 using the voice characteristic parameter corresponding to the characteristic information extracted in step S221 as a key, and checks if there is the matching entry.

If the matching entry exists in the address book 131 as a result of the search (S222, YES), the communication partner in the incoming call received this time is identified as the same individual registered in the address book 131. So the communication terminal device 1 decides addition registration, overwrite registration or new registration, based on a pre-setting (S223), and performs processing to register the new telephone number used by the individual, who already has been registered in the address book 131, in the address book. In the present embodiment, a rule data (not illustrated) has been stored in the RAM 13 in advance, and the communication terminal device 1 can decide the operation to be performed in step S223 according to this value.

For example, if "1" is stored in the rule data, the communication terminal device 1 performs addition registration for adding the new telephone number used in the call received this time to the entry of the individual already registered in the address book 131 (S224). If "2" is stored in the rule data, the communication terminal device 1 performs overwrite registration for replacing the telephone number registered in the entry of the individual already registered in the address book 131 with the new telephone number used for the call received this time (S225). If "3" is stored in the rule data, the communication terminal device 1 performs new registration for creating a new entry in the address book 131, registering the new telephone number used for the call received this time (S226).

If there is no matching entry in the address book 131 as a result of search (S222, NO), the communication terminal device 1 performs new registration for registering the new telephone number used for the call received this time (S226). When the processing in steps S224, S225 or S226 complete, the communication terminal device 1 performs the processing in step S21 in FIG. 7.

Figure 9:
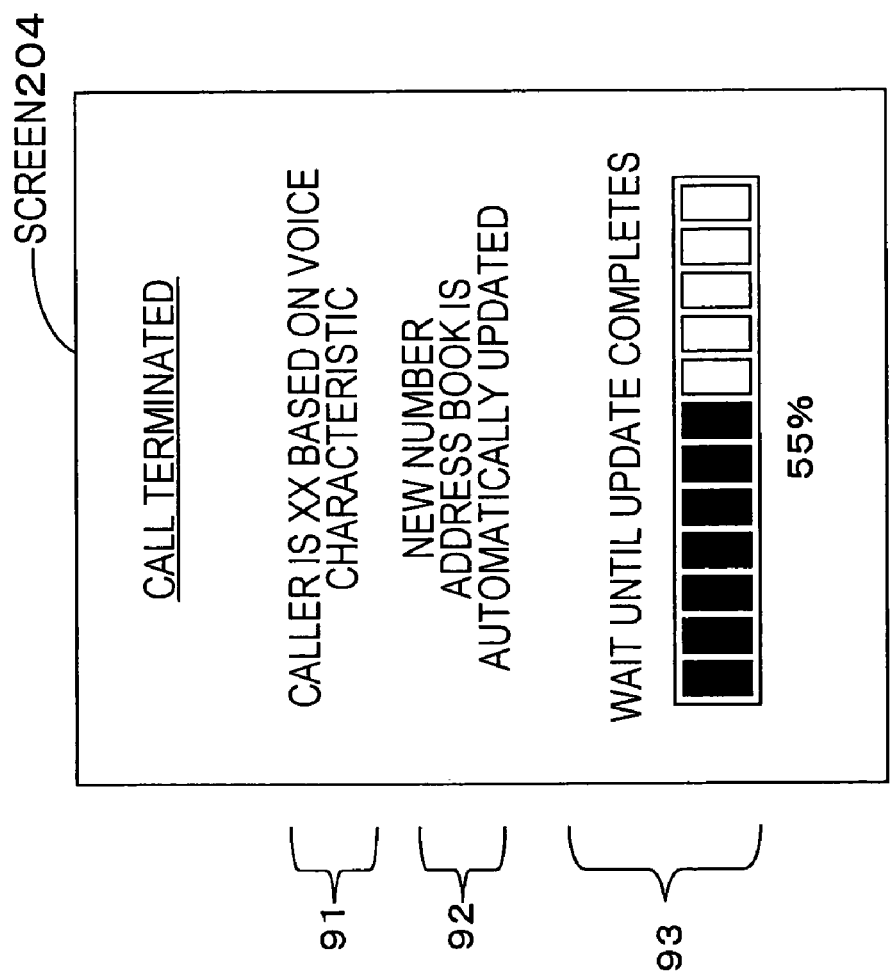
FIG. 9 is a screen example displayed on the display section in automatic registration processing.

FIG. 9 shows a screen example displayed on the display section 17 when the entry matching with the characteristic information of the address book 131 exists in the automatic registration processing in FIG. 8. In this case, the communication terminal device 1 automatically performs update processing of the address book 131 based on the rule data, and a message 91 for notifying that the individual transmitted the call received this time is an individual already registered in the address book 131, a message 92 for notifying that the address book 131 is automatically updated, and a message 93 for notifying the progress status until update completion are displayed on the screen 204.

FIG. 10A shows a data configuration example of the address book 131 before the automatic registration processing in FIG. 8. It is assumed that incoming call is received from an individual matching the voice characteristic of the second entry (Bill) in FIG. 10A via a new telephone number (06-xxxx-xxxx), which is different from the registered telephone number (090-xxxx-xxxx) in this status.

FIG. 10B shows a data configuration example of the address book 131 after the addition registration in FIG. 8. In FIG. 10B, the new telephone number (06-xxxx-xxxx) used for the incoming call received this time is added to the "Identification Number" of the individual matching the voice characteristic of the second entry (Bill).

FIG. 10C shows a data configuration example of the address book 131 after the overwrite registration in FIG. 8. In FIG. 10C, the "Identification Number" of the individual matching the voice characteristic of the second entry (Bill) is replaced with the new telephone number (06-xxxx-xxxx) used for the call received this time.

FIG. 10D is a data configuration example of the address book 131 after the new registration in FIG. 8. In FIG. 10D, another entry (Bill (2)), having the same voice characteristic as the individual matching the voice characteristic of the second entry (Bill), is added.

The above description is for the processing performed when incoming call is received, but can also be applied to, the processing performed when outgoing call is transmitted. In this way, registration of the new telephone number on the individual already registered in the address book 131 is automatically performed when incoming call is received from or outgoing call is transmitted to the individual.

On occasions other than outgoing and incoming call, the user may manually register the telephone number in the address book 131 while reading telephone numbers remaining in the outgoing and incoming history table 132. Since the communication terminal device 1 of the present embodiment automatically calls up the entry of which voice characteristic matches from the entries registered in the address book 131, the operation load for registration operations placed on the user can be decreased.

Figure 11:
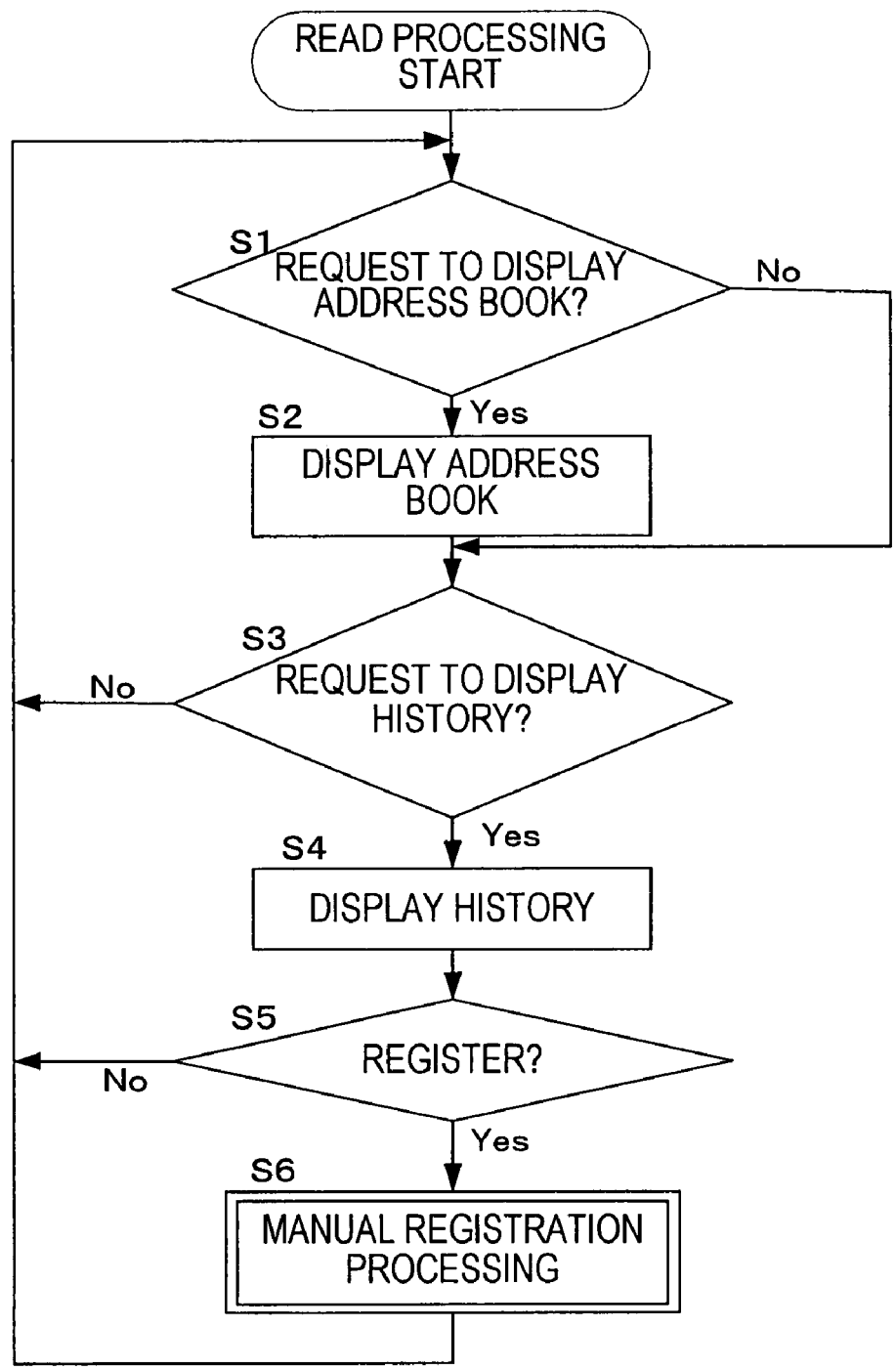
FIG. 11 is a flow chart depicting the read processing in the communication terminal device of the present embodiment.

FIG. 11 is a flow chart depicting the read processing in the communication terminal device 1 of the present embodiment. The read processing is a processing for displaying the information registered in the address book 131 or information stored in the outgoing and incoming call history table 132 on the display section 17, and reading it.

First the communication terminal device 1 judges whether the display request of the address book 131 is input (S1). If the address book 131 is selected via the input section 16 in the status where the operation menu of the communication terminal device 1 is displayed on the display section 17, the communication terminal device 1 judges that the display request of the address book 131 is input.

Figure 12:
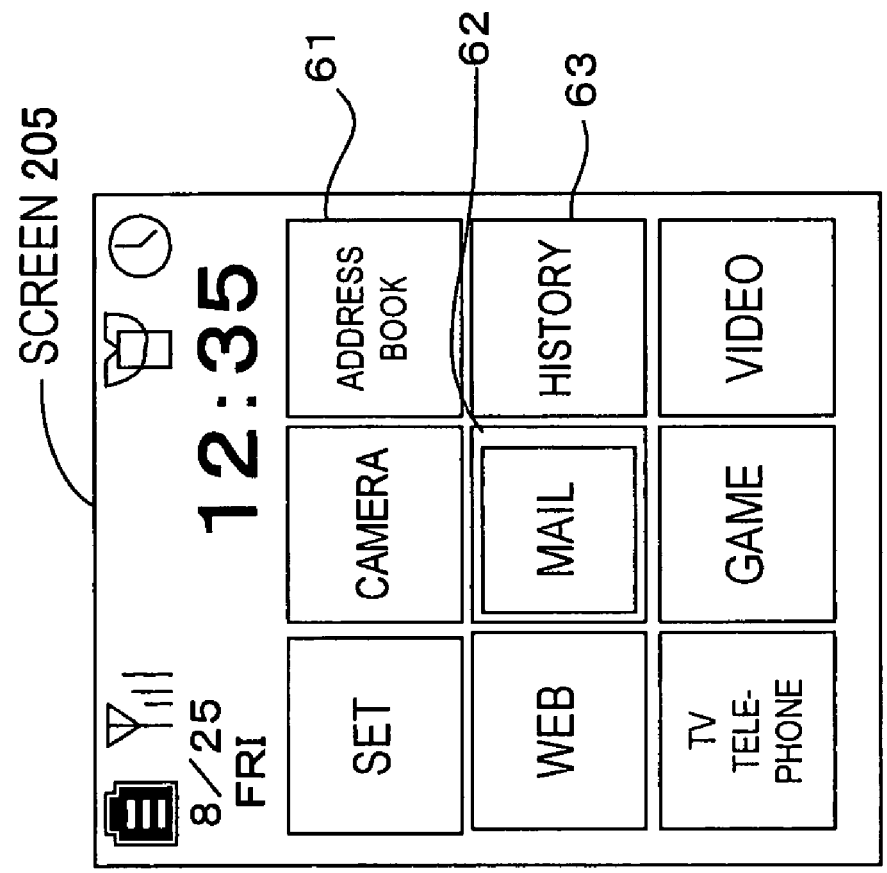
FIG. 12 shows an example of a menu screen displayed on the display section in read processing.

FIG. 12 is an example of the menu screen displayed on the display section 17 in the read processing. Nine items are displayed on the screen 205 as icons on a menu, and the selection target is switched by moving the cursor 62 displayed on the screen 205 by operating the buttons disposed on the input section 16 (see FIG. 3B, cross keys 54, for example).

"Mail" at the center is the selection target on the screen 205. The menu is selected by the user moving the cursor 62 to the selection target, and deciding by using the decision button 55 shown in FIG. 3B.

Icons on the menu include an "Address Book" icon 61 for displaying the information registered in the address book 131, and a "History" icon 63 for displaying the information stored in the outgoing and incoming call history table 132. Therefore if the user moves the cursor 62 to the "Address Book" icon 61 using the cross keys 54 and presses the decide button 55, the communication terminal device 1 judges that the display request for the address book 131 is input in the processing in step S1 in FIG. 11.

In FIG. 11, if the display request for the address book 131 is input (S1, YES), the communication terminal device 1 displays the information stored in the address book 131 on the display section 17. This state is as shown in FIG. 3A.

If the display request for the address book 131 is not input (S, NO), the communication terminal device 1 judges whether the display request for the outgoing and incoming call history table 132 is input (S3). For example, if the user moves the cursor 62 to the "History" icon 63 shown in FIG. 12 using the cross keys 54 and presses the decide button 55, the communication terminal device 1 judges that the display request for the outgoing and incoming call history table 132 is input.

If the display request for the outgoing and incoming call history table 132 is input (S3, YES), the communication terminal device 1 displays the information stored in the outgoing and incoming call history table 132 on the display section 17 (S4). This status is as shown in FIG. 5.

Then the communication terminal device 1 judges whether the registration request is input for the outgoing and incoming call history table 132 currently being read (S5). For example, if the user presses the □ button 53 in the input section 16 shown in FIG. 3B, the registration button 36 shown in the screen 202 in FIG. 5 is selected, and the communication terminal device 1 judges that the registration request is input.

If the registration request is input (S5, YES), the communication terminal device 1 executes the manual registration processing (S6). The manual registration processing is described in FIG. 12. If neither the display request for the address table 131 nor the display request for the outgoing and incoming call history table 132 is input (S3, NO), if the registration request is not input (S5, NO), or if the manual registration processing is completed (S6), the communication terminal 1 returns to step S1 and waits for a new display request.

Figure 13:
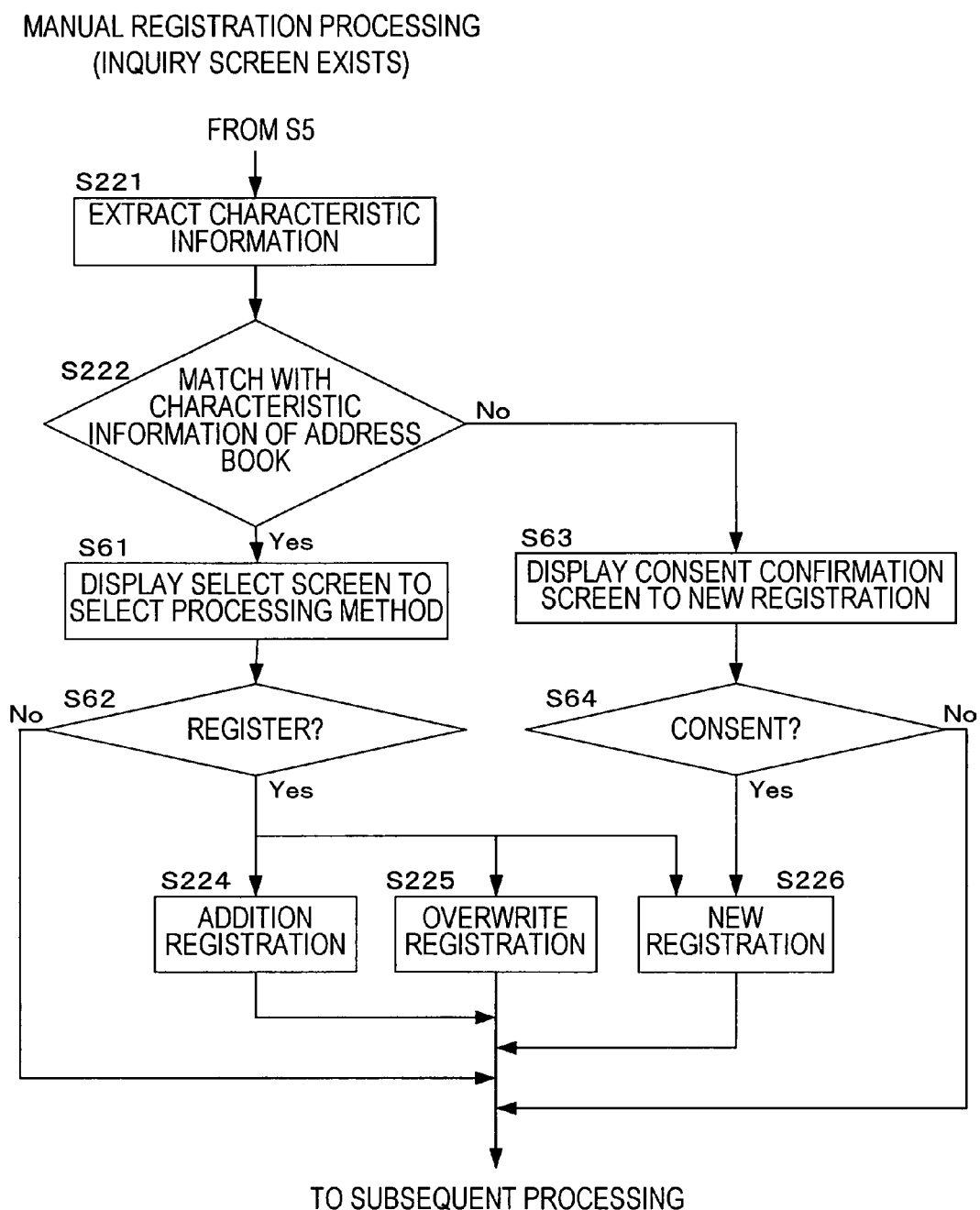
FIG. 13 is a flow chart depicting the manual registration processing in the communication terminal device of the present embodiment.

FIG. 13 is a flow chart depicting the manual registration processing in the communication terminal device 1 of the present embodiment. First the communication terminal device 1 extracts the characteristic information based on the recorded voice data (S221). Then the communication terminal device 1 judges whether the characteristic information extracted in step S221 matches the characteristic information stored in the address 131 (S222). The processings in steps S221 and S222 are the same as the processings in steps S221 and S222 in the automatic registration processing in FIG. 8, so description thereof is omitted.

If the matching entry exists in the address book 131 as a result of search (S222, YES), the communication terminal device 1 displays the select screen to select a processing method on the display section 17 (S61). This is for the user to select one of overwrite registration, addition registration and new registration described in the automatic registration processing.

Figure 14:
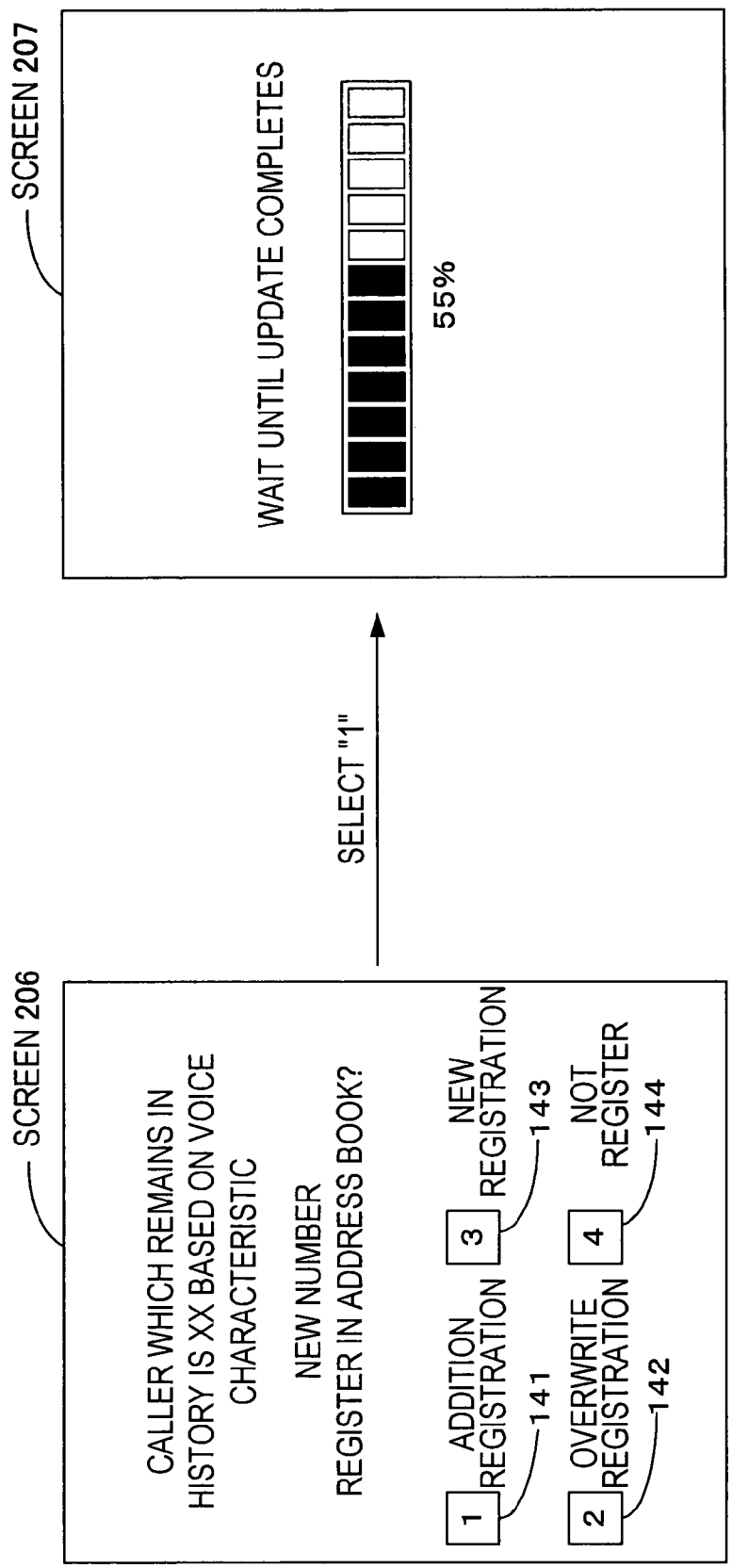
FIG. 14 shows an example of a select screen displayed on the display section in manual registration processing.

FIG. 14 is an example of the select screen which is displayed on the display section 17 in the manual registration processing. A button 141 to indicate addition registration, a button 142 to indicate overwrite registration, a button 143 to indicate new registration, and a button 144 to indicate that no registration is performed are displayed on the screen 206.

If the user selects one of the buttons shown on the screen 206 via the input section 16, corresponding processing is performed. For example, if the button 141 to indicate addition processing is selected on the screen 206, the addition registration is performed, and during this time, the message 93 to notify the progress status up to completion of an update of the address book 131, as shown on the screen 207, is displayed.

In FIG. 13, the communication terminal device 1 waits for the input of one of the selections in a status where the select screen is displayed (S62). Then processing is performed according to the selected input.

For example, if the button 141 to indicate addition registration is selected on the screen 206 (S62, YES), the communication terminal device 1 performs addition registration to add the telephone number selected in the outgoing and incoming call history table to the entry of the individual already registered in the address book 131 (S224). If the button 142 to indicate overwrite registration is selected on the screen 206 (S62, YES), the communication terminal device 1 performs overwrite registration to replace the telephone number registered in the entry of the individual already registered in the address book 131 with the telephone number selected in the outgoing and incoming call history table (S225).

If the button 143 to perform new registration is selected on the screen 206 (S62, YES), the communication terminal device 1 performs new registration to create a new entry in the address book 131, and registers the telephone number selected in the outgoing and incoming call history table (S226).

The processings in steps S224, S225, and S226 are the same processings as steps S224, S225, and S226 of the automatic registration processing in FIG. 8, so description thereof is omitted. If the button 144 to indicate that no registration is performed is displayed on the screen 206 (S62, NO), the communication terminal device 1 ends the manual registration processing.

If the matching entry does not exist in the address book 131 as a result of the search in step S222 (S222, NO), the communication terminal device 1 displays a consensus confirmation screen for new registration on the display section 17 (S63). This is for the user to confirm execution of new registration.

Figure 15:
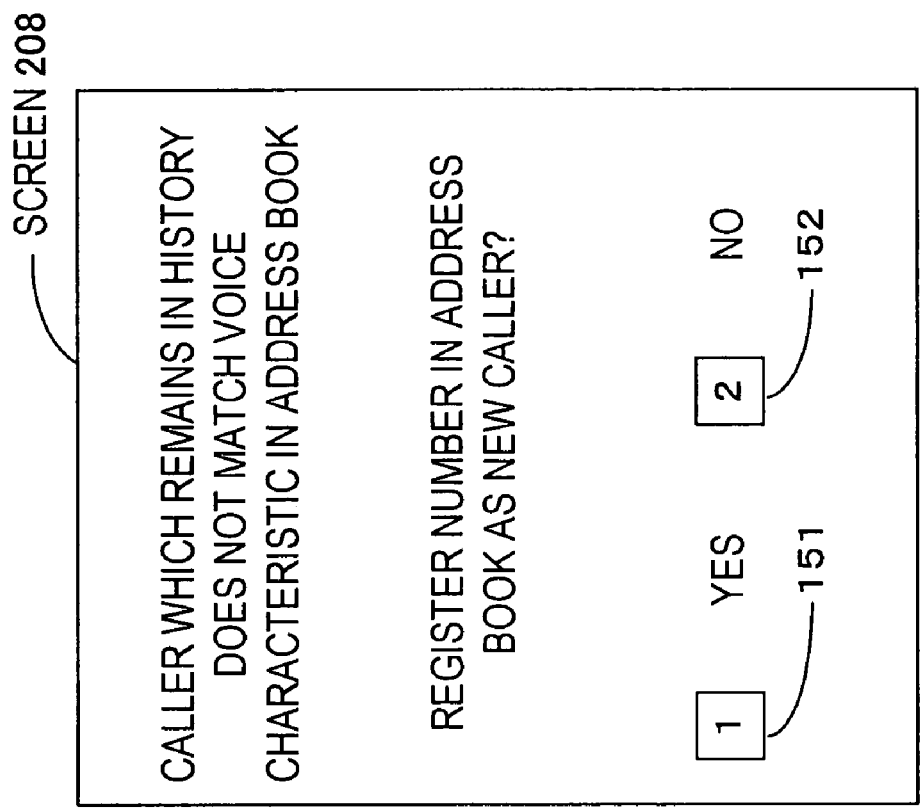
FIG. 15 shows an example of a consensus confirmation screen displayed on the display section in manual registration processing.

FIG. 15 is an example of the consensus confirmation screen displayed on the display section 17 in the manual registration processing. A "YES" button 151 to indicate consensus of the user and a "NO" button 152 to indicate denial of the user are displayed on the screen 208. If the user selects one of the buttons displayed on the screen 208 via the input section 16, corresponding processing is performed.

In FIG. 13, the communication terminal device 1 waits for one of the selected inputs in the status where the consensus confirmation screen is displayed (S64). And processing according to the selected input is performed.

If the "YES" button 151 is selected on the screen 208 (S64, YES), for example, the communication terminal device 1 creates a new entry in the address book 131, and performs new registration to register the selected telephone number in the outgoing and incoming call history table (S226).

If the "NO" button 152 is selected on the screen 206 (S64, NO), the communication terminal device 1 ends the manual registration processing.

Figure 16:
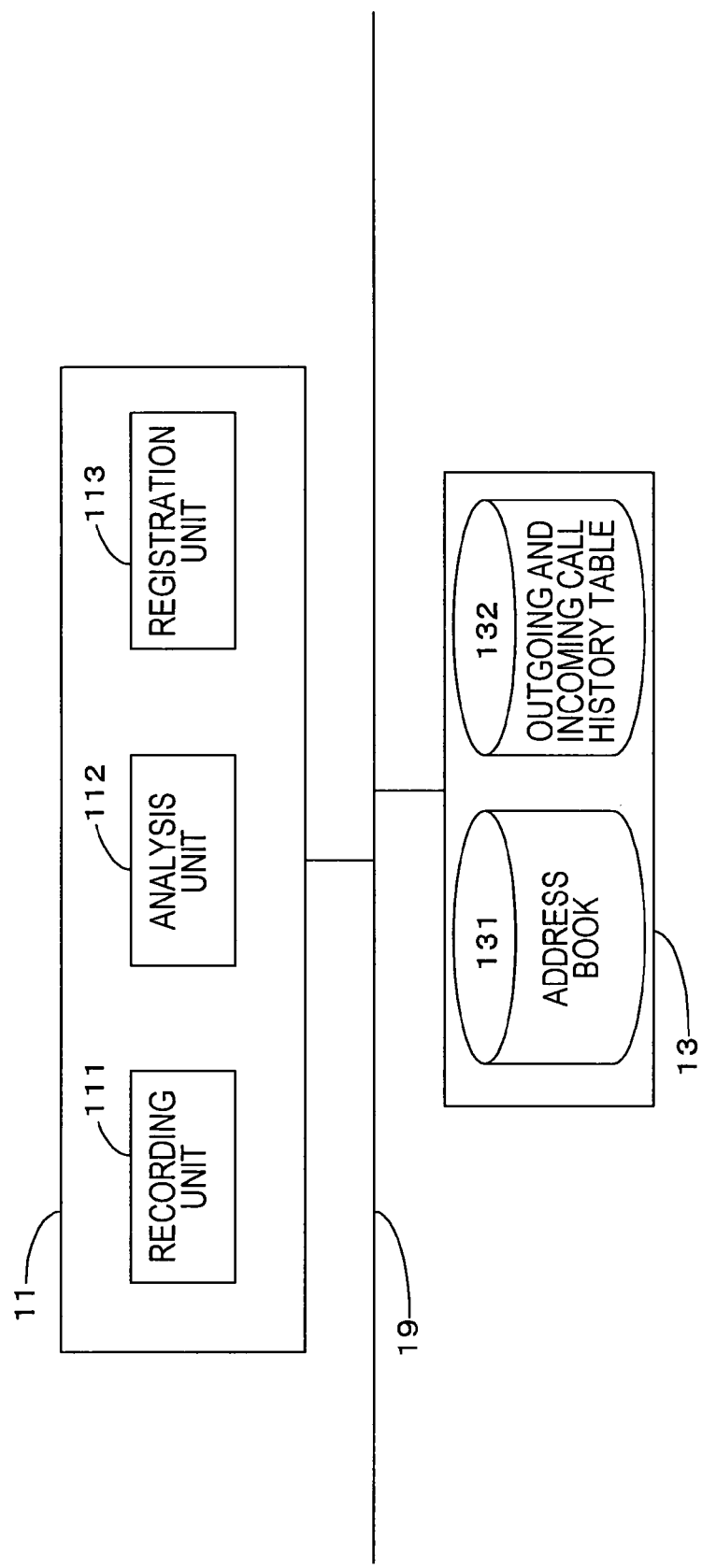
FIG. 16 is a block diagram depicting the functions of the communication terminal device 1 of the present embodiment.

FIG. 16 is a block diagram depicting the functions of the communication terminal device 1 of the present embodiment. The control unit 11 of the communication terminal device 1 has a recording unit 111, an analysis unit 112 and a registration unit 113. Each unit of the control unit 11 is implemented as a program executed by the CPU (not illustrated) of the control unit 11, but functions may also be implemented by hardware.

If the telephone number of the communication partner at the outgoing destination or the outgoing source is not included in the address book 131, the recording unit 111 records the voice of the communication partner at the outgoing destination or the outgoing source. The analysis unit 112 extracts the characteristic information to identify the communication partner based on the voice recorded by the recording unit 111. If the characteristic information extracted by the analysis unit 112 is included in the address book 131, the registration unit 113 updates the entry in the address book 131 by associating the telephone number of the communication partner at the outgoing destination or the outgoing source with the characteristic information included in the address book 131.

If the identification number of the communication partner at the outgoing destination or the outgoing source is not included in either the address book 131 or the outgoing and incoming call history table 132 when outgoing or incoming call is occurred, the recording unit 111 may record the voice of the communication partner. In this case, the analysis unit 112 stores the extracted characteristic information in the outgoing and incoming call history table 132 in association with the identification number of the communication partner at the outgoing destination or the outgoing source.

As described above, according to the communication terminal device 1 of the present embodiment, the user is specified based on the characteristic information of the voice of the user. So even if the user already registered in the address book 131 calls the communication terminal device 1 of the present embodiment using the new number which is different from the number registered in the address book 131, the communication terminal device 1 can identify that the communication partner who called is the user already registered in the address book 131. Since the communication terminal device 1 automatically calls up the entry registered in the address book 131, operation to register the new number in the address book 131 is easier. The communication terminal device 1 can also automatically perform the operation to register the new number to the address book 131, so operation load on the user can be further decreased.

In this description of the present embodiment, a portable telephone or a slave unit of a cordless telephone is used as an example of the communication terminal device, but the present embodiment can also be applied to a communication terminal device, such as a telephone having the incoming history function and the address book function (including a master unit of a cordless telephone).

The present embodiment can be applied to a communication terminal device such as a telephone having the incoming history function and the address book function.

What is claimed is:

1. A communication terminal device including a storage unit with an address book having entries where name information for specifying a communication partner, an identification number of the communication partner and characteristic information of a voice of the communication partner, are associated with one another, a display unit for displaying the information registered in the address book based on a display request, and an input unit for inputting a select signal for specifying the communication partner using the information registered in the address book and displayed on the display unit, so as to allow bi-directional voice communication with another communication terminal device having the identification number corresponding to the communication partner specified via the input unit, comprising:

a recording unit which records voice signals of the communication partner at a source or a destination, if the identification number of the source or the destination is not included in the address book;

an analysis unit which extracts the characteristic information from the voice signals recorded by the recording unit; and a registration unit which updates an entry in the address book for the communication partner to associate the identification number of the source or the destination of the communication partner if the characteristic information extracted by the analysis unit is included in the address book, by displaying on the display unit, a screen to select a first processing for updating the entry in the address book by associating the identification number of the source or the destination of the communication partner with the characteristic information included in the address book, or a second processing for overwriting the entry in the address book by replacing the identification number associated with the characteristic information included in the address book, with the identification number of the source or the destination of the communication partner.

2. The communication terminal device according to claim 1, wherein if the characteristic information extracted by the analysis unit is not included in the address book, the registration unit adds a new entry in the address book by associating the identification number of the source or the destination of the communication partner with the characteristic information extracted by the analysis unit.

3. The communication terminal device according to claim 1, wherein if the characteristic information extracted by the analysis unit is not included in the address book, the registration unit displays a screen to select a third processing for adding a new entry in the address book by associating the identification number of the source or the destination of the communication partner, with the characteristic information extracted by the analysis unit, on the display unit.

4. The communication terminal device according to claim 1, wherein the storage unit further includes an outgoing and incoming call history table which includes the identification number of the destination of the communication partner to which an outgoing call is transmitted or the source of the communication partner from which an incoming call is received, and the characteristic information of the voice of the communication partner, and wherein the recording unit records the voice signals from the communication partner for the outgoing call or the incoming call if the identification number of the source or the destination of the communication partner is not included in either the address book or the outgoing and incoming call history table, and the analysis unit stores the characteristic information in the outgoing and incoming call history table in association with the identification number of the source or the destination of the communication partner.

5. A computer-readable non-transitory medium embodying a computer program which when executed causes a communication terminal device including a storage unit with an address book having entries where name information for specifying a communication partner, an identification number of the communication partner and characteristic information of a voice of the communication partner, are associated with one another, a display unit for displaying the information registered in the address book based on a display request, and an input unit for inputting a select signal for specifying the communication partner using the information registered in the address book and displayed on the display unit, so as to allow bi-directional voice communication with another communication terminal device having the identification number corresponding to the communication partner specified via the input unit, to perform a method comprising:

recording voice signals of the communication partner at a source or a destination, if the identification number of the source or the destination is not included in the address book;

extracting the characteristic information from the voice signals recorded by the recording unit;

updating an entry in the address book for the communication partner to associate the identification number of the source or the destination of the communication partner with the characteristic information included in the address book, if the characteristic information extracted by the analysis unit is included in the address book; and displaying, on the display unit, a screen to select a first processing for updating the entry in the address book by associating the identification number of the source or the destination of the communication partner with the characteristic information included in the address book, or a second processing for overwriting the entry in the address book by replacing the identification number associated with the characteristic information included in the address book, with the identification number of the source or the destination of the communication partner, if the extracted characteristic information is included in the address book.

6. The computer-readable non-transitory medium according to claim 5, the method performed when the computer program is executed further comprising adding a new entry in the address book by associating the identification number of the source or the destination of the communication partner with the characteristic information extracted, if the characteristic information is not included in the address book.

7. The computer-readable non-transitory medium according to claim 5, the method performed when the computer program is executed further comprising displaying, on the display unit, a screen to select a third processing for adding a new entry in the address book by associating the identification number of the source or the destination of the communication partner with the characteristic information extracted if the characteristic information is not included in the address book.

8. The computer-readable non-transitory medium according to claim 5, wherein the storage unit stores an outgoing and incoming call history table which includes the identification number of the destination of the communication partner to which an outgoing call is transmitted or the source of the communication partner from which an incoming call is received, and the characteristic information of the voice of the communication partner, and wherein the method performed when the computer program is executed further comprises:

recording the voice signals from the communication partner for the outgoing call or the incoming call if the identification number of the source or the destination of the communication partner is not included in either the address book or the outgoing and incoming call history table, and storing the characteristic information in the outgoing and incoming call history table in association with the identification number of the source or the destination of the communication partner.

9. An outgoing and incoming call processing method in a communication terminal having a storage unit with an address book which includes a plurality of entries where a name information for specifying a communication partner, an identification number of the communication partner, and characteristic information of voice of the communication partner, are associated with one another, a display unit for displaying the information registered in the address book based on a display request, and an input unit for inputting a select signal for specifying the communication partner using the information registered in the address book and displayed on the display unit, so as to allow bi-directional communication using voices, with the communication terminal device with the identification number corresponding to the communication partner specified via the input unit, the method comprising:

recording voice signals of the communication partner at a source or a destination, if the identification number of the source or the destination is not included in the address book;

extracting the characteristic information from the voice signals recorded by the recording unit;

updating an entry in the address book for the communication partner to associate the identification number of the source or the destination of the communication partner with the characteristic information included in the address book, if the characteristic information extracted by the analysis unit is included in the address book; and displaying, on the display unit, a screen to select a first processing for updating the entry in the address book by associating the identification number of the source or the destination of the communication partner with the characteristic information included in the address book, or a second processing for overwriting the entry in the address book by replacing the identification number associated with the characteristic information included in the address book, with the identification number of the source or the destination of the communication partner, if the extracted characteristic information is included in the address book, by the communication terminal device.

10. The outgoing and incoming call processing method according to claim 9, further comprising adding a new entry in the address book by associating the identification number of the source or the destination of the communication partner with the characteristic information extracted, if the characteristic information is not included in the address book, by the communication terminal device.

11. The outgoing and incoming call processing method according to claim 9, further comprising displaying, on the display unit, a screen to select a third processing for adding a new entry in the address book by associating the identification number of the source or destination of the communication partner with the characteristic information extracted, if the characteristic information is not included in the address book, by the communication terminal device.

12. The outgoing and incoming call processing method according to claim 9, wherein the storage unit stores an outgoing and incoming call history table that includes the identification number of the destination of the communication partner to which an outgoing call is transmitted or the source of the communication partner from which an incoming call is received, and the characteristic information of the voice of the communication partner, and wherein the method further comprises:

recording the voice signals from the communication partner for the outgoing call or the incoming call if the identification number of the source or destination of the communication partner is not included in either the address book or the outgoing and incoming call history table, by the communication terminal device; and storing the characteristic information extracted in the outgoing and incoming call history table in association with the identification number of the source or destination of the communication partner, by the communication terminal device.

* * * * *